Patented Mar. 29, 1932

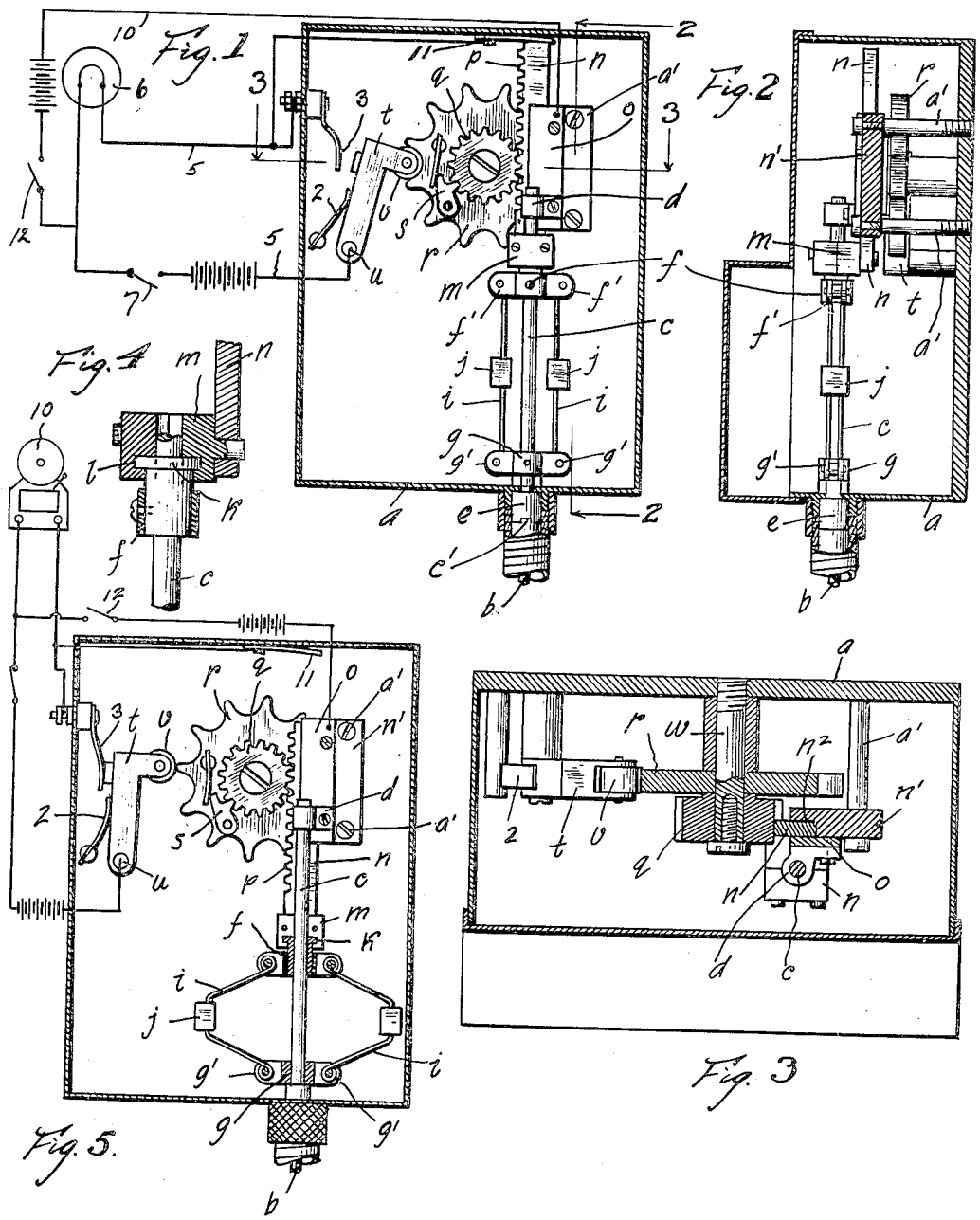

1,851,498

UNITED STATES PATENT OFFICE

DORR B. DOANE, OF PORTLAND, OREGON

AUTOMATIC SIGNAL MEANS

Application filed December 14, 1927. Serial No. 239,933.

My invention relates to automatic means for actuating stop signals for motor vehicles.

The principal object of my invention is to provide automatic means especially adapted to actuate a stop-signal for motor vehicles, adapted for signaling preferably by an electric bulb, fixed on the rear of the vehicle in the usual manner, whenever the speed of the motor vehicle is decreased.

Heretofore, stop-signals have been provided comprising a signal fixed on the rear of the car and actuated by the movement of the clutch or brake pedal. Such means have disadvantages, however; if the car is slowed down without the use of either brake or clutch, the signal is not actuated, and when, if going down a hill for instance, the brake is used merely to prevent increasing the speed, the stop-signal is also actuated, all of which contributes to the confusion of following motorists.

Another object of my invention is to provide simple, inexpensive, and reliable means, adapted to be installed on a machine, and to be automatically actuated, whenever the speed of the machine varies beyond certain predetermined limits, by means influenced by centrifugal force, conveniently taken from its driven member, to indicate by an alarm, a condition requiring attention, or to automatically reduce or accelerate the speed of the said machine to within the predetermined limits.

I attain the objects of my invention in a device comprising in combination with a driven member of a motor vehicle, a shaft which is connected with said driven member and centrifugal governing means provided on said shaft, connected with said governing means and a gear meshing with said rack bar, the gear being mounted on a pin, in common with a sprocket, which is adapted to be rotated when the gear is rotated in one direction and to remain stationary when said gear is rotated in the other. A dog is provided bearing against said sprocket, and an electric contact point forming a make and break switch with said dog, and electrical indicating means are connected with said switch, whereby when the rate of rotation of said shaft changes, the said governing means will close the switch, and actuate the indicating means, and when the rotation of said shaft is constant, said indicating means will be inactive.

A specific form of my invention, and the mode of operation thereof are hereinafter described in detail with reference to the accompanying drawings.

In the drawings:

Fig. 1 shows in a plan view of my invention, the details of construction, and illustrates diagrammatically the electrical connections of the signal means;

Fig. 2 shows a section taken on the line 2—2 of Fig. 1, and illustrates further details of construction;

Fig. 3 shows a section taken on the line 3—3 of Fig. 1;

Fig. 4 shows an enlarged fragmentary sectional view of the movable sleeve of the governing device and its connection to the rack bar; and Fig. 5 shows in a view similar to Fig. 1, a bell substituted for an electric light, as the signal means and illustrates the governing device in an operative position.

Referring now to the figures, my automatic signal means comprise a housing $a$ mounted on any convenient place on the motor vehicle, adjacent the drive shaft from which power may be taken by suitable means and transmitted by a flexible shaft element $b$ to the mechanism contained in the housing.

Within the housing is mounted a shaft $c$, journaled as at $d$ and $e$, the said shaft being connected with the flexible shaft element $b$, as at $c'$ and driven thereby.

On the shaft $c$, adjacent the journal $e$ is fixed a collar $g$, provided with oppositely extending lugs $g'$, and slidably mounted on the shaft $c$ is another collar $f$, provided with similar lugs $f'$. Resilient elements $i$ are connected at each end to the lugs $f'$ and $g'$, respectively, and weights $j$ are centrally fixed on each resilient element, thus forming a centrifugal governor.

The collar $f$ is provided with a peripheral flange $k$, which is seated in an annular groove $l$, formed in a split block $m$, fixed to a rack bar $n$, slidably mounted on a supporting member $n'$, in a groove $n2$. The supporting member $n'$ is spaced from the wall of the housing by bolts $a'$, and the rack bar $n$ is held in place by a plate $o$ secured to the said supporting member $n'$. The rack bar is arranged with the teeth $p$ extending outwardly, which mesh with a gear $q$ rotatably mounted on a pin $w$. A sprocket $r$ is also mounted on the said pin, underneath the gear $q$, and is provided with a spring controlled pawl $s$, which normally engages one of the teeth of the gear $q$.

Adjacent the other side of the sprocket gear $r$ is pivoted a dog $t$ as at $u$, provided with a roller $v$ at its free end. A spring 2, normally holds the dog $t$, so that the roller $v$, engages the teeth of the said sprocket.

An electrical contact point 3 is provided on the wall of the housing, adjacent the free end of the dog $t$, forming a make and break switch. A suitable electrical circuit 5 is connected with the dog $t$ and the contact point 3, in which is provided an incandescent bulb 6, conveniently arranged on the motor vehicle, preferably at the rear, and a control switch 7 is provided in the said circuit in order that the signaling means may be disconnected when desirable.

Also a supplementary circuit 10 is provided, connected at one end to the plate $o$, and at its other end to a spring contact 11, arranged adjacent the end of the rack bar $n$, and adapted to bear against it. The circuit 10 is provided with a switch 12 and also includes the bulb 6, but is adapted to function independently of the main circuit 5.

The operation of my automatic stop-signal is as follows:

The shaft $c$, being driven from the drive shaft of the motor vehicle is always rotating when the motor vehicle is moving, and the weights $j$ will tend to draw the flexible elements $i$ outwardly as they are rotated, due to their centrifugal pull, Fig. 1, which will draw the collar $f$ and the rack bar $n$ longitudinally from the sprocket gear $r$, and rotate the gear $q$; the pawl $s$ riding over the teeth of the gear $q$, permitting the said gear to rotate independently of the sprocket.

However, whenever the speed of rotation of the drive shaft decreases, that is, the speed of the motor vehicle, the weights $j$ will be drawn inward, Fig. 5, by the resilient elements $i$, since the centrifugal pull of the weights $j$ will be less, due to the decreased rate of rotation, and the collar $f$ and the rack bar $n$ will move toward the sprocket and rotate the gear $q$. The pawl $s$ meanwhile engages one of the teeth of the said gear, and rotates the sprocket $r$, which causes the dog $t$ to ride over the sprocket teeth as it rotates, and force the back of the dog into contact with the contact point 3, closing the circuit 5 and actuating the bulb 6. Since the rotation of the sprocket is relatively rapid, the dog will be held against the contact point almost continuously, so that the bulb will be actuated to flash intermittently but at a very rapid rate, the rate of flash, however, being relative to the rate of deceleration of the vehicle. Therefore, the rate of deceleration of the vehicle will be substantially indicated in the rate of flash of the signal, so that the signal will not only indicate the fact that the vehicle is slowing down but will also indicate the rate at which it is slowing.

Further it is plainly to be seen that my invention will function equally well in case the direction of rotation of the driven element is reversed, that is, if the motor vehicle is driven in a backward direction.

The spring contact 11 not only closes the circuit 10 when the motor vehicle is standing, but due to its elasticity follows the rack bar $n$ as it moves longitudinally away for a short distance, thus lighting the bulb 6 at all speeds up to, say for example five miles an hour. This feature is especially advantageous when moving slowly or when backing up, as the bulb 6 will be lighted independently of the functioning of the main circuit 5. When standing or at any other time it is desirable to cut out the circuit 10, it may be conveniently done by opening the switch 12. Also, the switches 7 and 10 may be combined as one switch or they may both be combined with the ignition switch, all of which would be a matter of choice.

In Fig. 5, I have shown how my invention may be adapted for other uses, than as a stop-signal, for instance, for actuating an alarm bell 10, indicating a condition in a machine needing attention, as in a manufacturing plant or machine shop.

Also by merely reversing the position of the pawl 3, with relation to the gear $q$, the dog $t$ can be actuated by the increased speed of the shaft $c$, rather than by a decreased speed.

I claim:

1. An automobile operated means including a driven member responsive to vehicle movement, a shaft connected to the driven member, governor means driven by said shaft, a rack bar connected to said governor means and movable therewith, a gear rotated by said rack bar upon movement thereof, means responsive to gear rotation in one direction and not responsive to gear rotation in the opposite direction, a signal, and signal operating mechanism operated by said last named means for flashing said signal.

2. An automobile operated device including a member responsive to vehicle movement, a circuit including a signal, and a normally open circuit closer in series, means when actuated for intermittently closing said circuit closer whereby the signal is flashed, a governor driven by said member, a member connected to said governor for movement therewith in one direction when the governor speed decreases, and in the opposite direction when the governor speed increases, and means connecting the second named member and the first named means for actuating the first named means upon movement of the second named member in one of said directions, and not actuating it upon movement in the other of said directions.

DORR B. DOANE.